United States Patent [19]
Bourset et al.

[11] Patent Number: 4,561,737
[45] Date of Patent: Dec. 31, 1985

[54] CONTACT LENS

[75] Inventors: Claude Bourset, Creteil; Georges Wajs, Ivry, both of France

[73] Assignee: Essilor International "Cie Generale d'Optique", Creteil Cedex, France

[21] Appl. No.: 366,656

[22] Filed: Apr. 8, 1982

[30] Foreign Application Priority Data

Apr. 15, 1981 [FR] France .................................. 81 07550

[51] Int. Cl.[4] .............................................. G02C 7/04
[52] U.S. Cl. ................................................ 351/160 R
[58] Field of Search .................... 351/160 R, 162, 177

[56] References Cited

U.S. PATENT DOCUMENTS 4,165,158 8/1979 Travnicek ....................... 351/160 H

FOREIGN PATENT DOCUMENTS 0003695 8/1979 European Pat. Off. .
2327562 5/1977 France .
2399043 2/1979 France .
2416104 7/1980 France .

OTHER PUBLICATIONS

Watkins, J. R.; "The Variables in the Anatomy of Contact Lens Edges"; *Contacto*; Nov. 1976; pp. 8–11.

*Primary Examiner*—John K. Corbin
*Assistant Examiner*—Scott J. Sugarman
*Attorney, Agent, or Firm*—Charles A. Brown; Charles E. Brown

[57] ABSTRACT

A contact lens has a rear surface, a front surface and a peripheral edge surface extending between the front and rear surfaces. The peripheral edge surface extends generally forwardly and obliquely from the rear surface to the front surface. The invention is more particularly, but not exclusively, applicable to flexible contact lenses, such as contact lenses manufactured of silicone and similar materials, for example.

15 Claims, 11 Drawing Figures

CONTACT LENS

BACKGROUND OF THE INVENTION

1. Field of the Invention

The present invention is generally concerned with contact lenses, that is to say lenses designed to be placed directly on the cornea of the eye.

2. Description of the Invention

Overall, a contact lens comprises a rear surface, a front surface, and a peripheral edge surface extending between the front and rear surfaces, defining with these the peripheral edge portion of the lens.

As is well known, two of the functional constraints to be met by a contact lens are at least partially dependent on the geometrical configuration of this edge portion: good adaptation to the eye of the user and an acceptable level of comfort for the user.

Previously, it has been generally accepted that for contact lenses, and in particular for flexible contact lenses such as those manufactured of silicone, for example, meeting these two functional constraints implied the use of a peripheral edge portion progressively tapering off to quasi zero thickness.

This is the case in French Patent No. 2 399 043 (filed as application No. 78 21 655 on July 21 1978), for example.

When a contact lens has a peripheral edge portion which progressively tapers, its peripheral edge surface extends generally obliquely and rearwardly, from the rear surface to the front surface, to follow as closely as possible the sclera of the eye while forming with the latter a tapering space intended to facilitate the introduction under the lens of a new film of lacrimal fluid each time the eyelid blinks, to secure the aforementioned good adaptation.

Good adaptation and acceptable comfort are usually obtained with this configuration of the peripheral edge portion.

With some contact lenses, however, and particularly those manufactured of silicone, this configuration of the peripheral edge portion frequently leads to a "sucker effect" whereby the lens adheres tightly to the cornea.

This is a major disadvantage in that, on the one hand, it opposes satisfactory circulation of lacrimal fluid between the lens and the cornea, necessary in order to renew the film of lacrimal fluid providing the required good adaptation, and in that, on the other hand, it may lead to problems with removing the lens at the end of the day.

In French Pat. No. 2 416 104 (filed as application No. 78 03323 on Feb. 7, 1978) and the corresponding European application No. 003695, one of a number of molding configurations disclosed is such as to produce on the contact lens concerned a plane peripheral edge surface extending substantially perpendicular to the axis of the lens.

Apart from this theoretical arrangement of a molding device, there is no suggestion anywhere in this French Patent application that the corresponding configuration of the lens is apt to overcome the problem of the "sucker effect".

In French Patent No. 2 327 562 (filed as application No. 76 29795 on Oct. 4, 1976) a contact lens is disclosed in which the peripheral edge surface is cylindrical and may therefore be regarded as lying wholly within that portion of space situated to the front of a reference surface which extends in a generally transverse direction relative to the axis of the lens and is tangential to the lens in the area in which the rear surface joins the peripheral edge surface.

In practice, the resulting shape of the edge portion of this type of contact lens is not apt to overcome the problem of the "sucker effect", which is nowhere mentioned in this French Patent application.

The general objective of the present invention is to provide a contact lens with which the "sucker effect" may be overcome and providing good adaptation and an acceptable level of comfort for the user.

SUMMARY OF THE INVENTION

The present invention consists in a contact lens, comprising a rear surface, a front surface, and a peripheral edge surface extending between said front and rear surfaces, said peripheral edge surface lying wholly within that portion of space situated to the front of a reference surface which extends in a generally transverse direction relative to the axis of said lens and is tangential to said lens in the area in which said rear surface joins said peripheral edge surface, said peripheral edge surface extending generally forwardly and obliquely from said rear surface to said front surface.

Thus instead of "trailing" towards the rear, as has been usual heretofore, this peripheral edge surface "points" forwards.

As experience shows, and has been confirmed by numerous tests, the configuration of the peripheral edge portion thus obtained, which goes totally against the grain of usual thinking on this matter and the shapes actually used, constitutes, in a surprising manner, a satisfactory solution to the problem of the "sucker effect", while securing good adaptation and acceptable comfort.

The explanation may possibly lie in the fact that the eyelid catches on the lens each time it moves, although this is without any discomfort to the user, insofar as either the eyelid or the cornea is concerned, this being due to the projecting configuration of the peripheral edge surface of the lens. As a result, the eyelid obliges the lens to move with it, at least within certain limits, breaking the intimate contact between the lens and the cornea responsible for the previously observed "sucker effect".

Further Discussion of the Prior Art

In French Patent application No. 78 03323 referred to hereinabove, there is no description or even suggestion that the peripheral edge surface of the contact lens concerned may extend obliquely and forwardly, even to a moderate extent.

This, however, is a fundamental characteristic of the contact lens in accordance with the invention.

In French Patent application No. 76 29795 also referred to hereinabove, the peripheral edge surface of the contact lens concerned is cylindrical, and so extends parallel to the axis of the lens. Thus in passing over the edge of this type of contact lens, the eyelid can only slide on the peripheral edge surface, without catching on the contact lens so as to move it and so prevent the "sucker effect".

This is not the case with the oblique peripheral edge surface in accordance with the invention.

Other objects and advantages will appear from the following description of examples of the invention, when considered in connection with the accompanying drawings, and the novel features will be particularly pointed out in the appended claims.

Brief Description of the Drawings

Referring to FIG. 1, a contact lens referenced generally at 10 is applied directly to the cornea 11 of the eye 12 of a patient.

It may be a flexible contact lens, for example, in particular a contact lens manufactured from silicone or a similar material.

Contact lens 10 comprises a rear surface 13, a front surface 14 and a peripheral edge surface extending between the front and rear surfaces.

Figure 1:
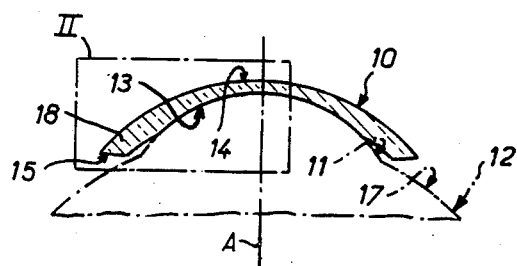
FIG. 1 is an axial cross-section through a contact lens in accordance with the invention.
Figure 2:
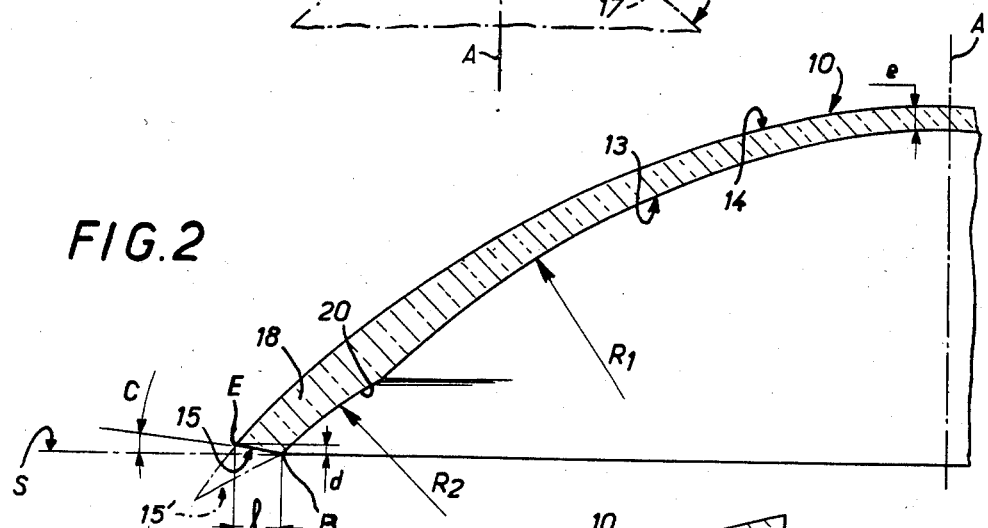
FIG. 2 shows part of FIG. 1, as indicated by the chain-dotted box II in FIG. 1, to a larger scale.

In practice, the lens is a body of revolution produced by rotation about a common axis A shown as a chain-dotted line in FIGS. 1 and 2. This is the geometrical axis of the lens and usually (although not necessarily) its optical axis.

The central portion of contact lens 10 provides the necessary optical correction.

In the embodiments shown in FIGS. 1 to 5, the contact lens is of the negative type, so that its thickness is minimal at the center, on axis A.

Its thickness e at the center may be approximately 0.15 mm, for example.

In practice, rear surface 13 of contact lens 10 is, at least in its central area, a part-spherical surface of radius R1.

Front surface 14 is of any shape, according to the correction required.

In particular, it may also be a part-spherical surface.

It may instead be a two-curve or aspherical surface, and/or may be thinned out over a peripheral portion, as will be described later.

It is rear surface 13, and more specifically the central area thereof, of contact lens 10 which is applied to cornea 11 of eye 12 of the patient, with a film of lacrimal fluid (not shown in FIG. 1) between contact lens 10 and cornea 11.

It is the peripheral part of contact lens 10 which provides good adaptation and acceptable comfort for the patient.

To this end, and as is well known per se, it is sufficiently developed to form, in the direction towards the sclera 17 of eye 12 of the patient, a peripheral edge portion 18 defined between peripheral edge surface 15 and the corresponding adjacent areas of rear surface 13 and front surface 14.

In the embodiment shown in FIGS. 1 and 2, and in a manner known per se, said corresponding area of rear surface 13 is formed by a part-spherical clearance surface 20 centered on axis A with a radius R2 greater than radius R1 of the central area of which it forms an extension.

As a result, it forms with eye 12 of the patient a tapering space facilitating the introduction under contact lens 10 of a new film of lacrimal fluid each time the patient's eyelid blinks, normally ensuring that the required good adaptation is secured.

In the embodiment shown in FIGS. 1 and 2, clearance surface 20 intercepts peripheral edge surface 15 along an edge B.

In this embodiment, edge B lies in a plane.

This is not necessarily the case, however.

Peripheral edge surface 15 of contact lens 10 in accordance with the invention lies wholly within that portion of space situated to the front of a reference surface S which extends in a generally transverse direction relative to axis A of the lens and is tangential to contact lens 10 in the area in which rear surface 13 thereof joins peripheral edge surface 15.

In the embodiment shown in FIGS. 1 and 2, as this area is formed by edge B defined above and as this is plane, reference surface S is a plane perpendicular to axis A of the lens.

Reference plane S is shown schematically in chain-dotted line in FIG. 2.

In this Figure, part of reference plane S is coincident with the point representing edge B in accordance with the invention.

In accordance with the invention, peripheral edge surface 15 extends generally forwardly and obliquely from rear surface 13 to front surface 14 of contact lens 10.

To emphasize the novelty of this arrangement, FIG. 2 shows schematically in chain-dotted outline the configuration of the peripheral edge portion of a conventional contact lens, the peripheral edge surface 15' of which extends generally rearwardly and obliquely from the rear surface to the front surface, as shown in the drawing.

In the embodiment shown in FIGS. 1 and 2, peripheral edge surface 15 of contact lens 10 in accordance with the invention is a part-conical surface, the axis of which is axis A.

In accordance with the invention, the concave side of this part-conical surface is directed forwardly, as shown in the drawing.

The angle c between reference surface S and any generatrix of this part-conical surface is preferably greater than 0° and less than or equal to 25°.

In view of the arrangement in accordance with the invention, the area in which peripheral edge surface 15 of contact lens 10 joins its front surface 14 is at least as far forward in the axial direction (in other words, parallel to axis A of the lens) as the area in which peripheral edge surface 15 joins rear surface 13. Preferably, and as shown in the drawing, it is farther forward.

In other words, in the embodiment shown in FIGS. 1 and 2 there is a difference d between the respective positions, in the axial direction, of the areas in which peripheral edge surface 15 joins rear surface 13 and front surface 14, with the latter farther forward.

In the embodiment shown in FIGS. 1 and 2, peripheral edge surface 15 intercepts surface 14 along an edge E which constitutes said area in which said peripheral edge surface 15 joins said front surface 14.

The aforementioned difference d is that between this edge E and edge B (and thus reference surface S).

The difference is preferably between 0.03 and 0.15 mm, and is thus sufficiently small as to be unfelt beneath the eyelid of the patient.

Either or both of edges B and E may be rounded off.

It will be seen that because of the arrangement in accordance with the invention peripheral edge portion 18 of contact lens 10, instead of being tapered towards its edge, has on the contrary a significant thickness 1 (in practice greater than the thickness e at the center) at its edge, as measured, for example, at the position of peripheral edge surface 15 which delimits it, and parallel to reference surface S.

This thickness 1 may be, for example, between 0.10 and 0.50 mm. It is preferably between 0.20 and 0.40 mm.

As will be appreciated, the numerical values given above have no limiting effect. They are given by way of example only.

MODIFICATIONS

In the foregoing description it has been supposed that peripheral edge surface 15 of contact lens 10 is geometrically defined by a part-conical surface.

As an alternative, it may be enveloped overall within a conical surface.

In this case, and as previously, the concave side of the cone is, in accordance with the invention, directed forwardly.

The configuration of peripheral edge surface 15 of contact lens 10 in accordance with the invention may vary considerably.

For example (FIG. 3) it may be defined by a part-elliptical surface joining rear surface 13 by way of a rounding off edge with a large radius of curvature.

Figure 3:
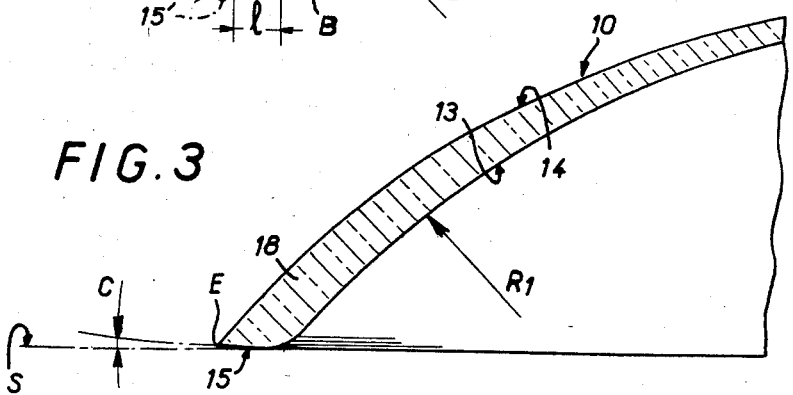
FIGS. 3 to 11 are partial views analogous to that of FIG. 2, showing respective alternate embodiments.

In the embodiment shown in FIG. 3, no specific clearance surface has therefore been provided on rear surface 13.

In this case, there is no longer an edge B in the strict sense, and the difference d defined hereinabove is measured relative to reference surface S.

Figure 4:
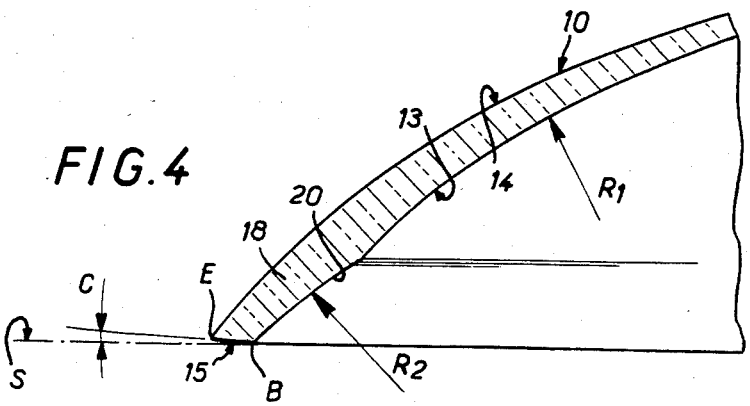

In the embodiment shown in FIG. 4, in which a clearance surface 20 is provided, peripheral edge surface 15 is defined by a part-toroidal surface.

Figure 5:
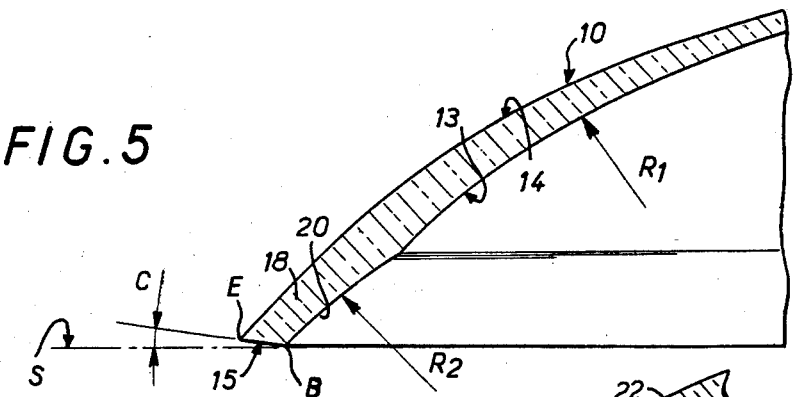

In the embodiment shown in FIG. 5, it is defined by a part-spherical surface.

In all cases, in accordance with the invention and as previously, the concave side is directed forwardly.

Also in all cases and as previously, the surface taken as reference surface S is tangential to the lens at its rear, in the area in which the peripheral edge surface joins the rear surface. In practice, in the embodiments shown, this is again a plane surface perpendicular to the axis of the lens.

Figure 6:
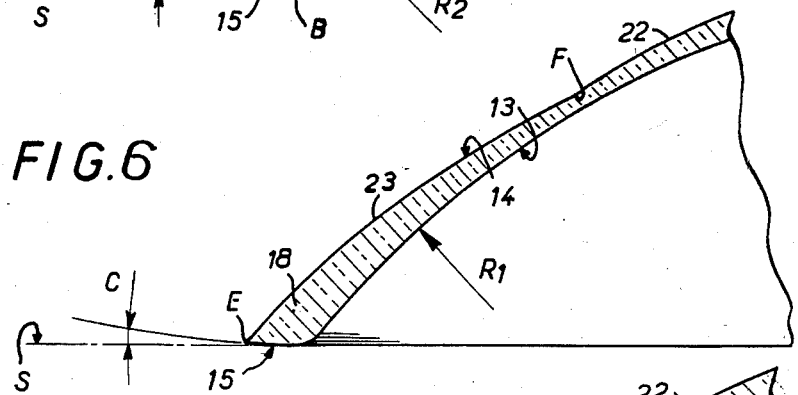
Figure 7:
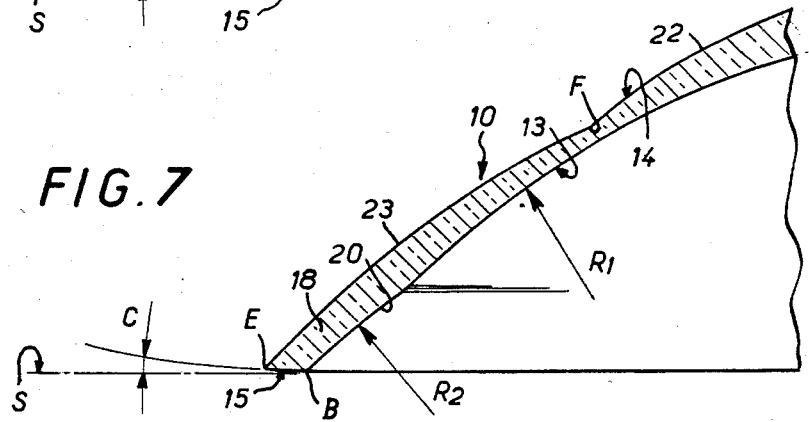

FIGS. 6 and 7 show the application of the invention to a positive contact lens.

In this case, front surface 14 of the contact lens is formed by a first surface 22 in its central area, which may be, for example, a part-spherical surface with a radius less than radius R1 of rear surface 13, and by a second surface 23 in its peripheral area, for example a part-spherical surface with a radius greater than radius R1 of rear surface 13.

Surfaces 22 and 23 then intersect along an edge F, which is preferably rounded off, at the position at which the thickness of contact lens 10 is minimal.

In the embodiment shown in FIG. 6 peripheral edge surface 15 of contact lens 10 is defined by a part-elliptical surface and, as previously, no clearance surface is therefore provided in the peripheral portion of its rear surface 13.

Alternatively (FIG. 7) peripheral edge surface 15 is defined by a part-toroidal surface and a clearance surface 20 is provided in the peripheral part of rear surface 13.

In the foregoing description it has been supposed that the area in which peripheral edge surface 15 of contact lens 10 joins front surface 14 thereof is constituted by an edge.

This is not necessarily the case.

For example (FIG. 8) it may be constituted by a part-cylindrical surface 24, with generatrices parallel to axis A of the lens.

Part-cylindrical surface 24 intersects peripheral edge surface 15 along a first edge E' and front surface 14 along a second edge E''.

As peripheral edge surface 15 extends, in accordance with the invention, generally forwardly and obliquely, lying wholly within that portion of space situated to the front of reference surface S which is tangential to the lens in the area in which its rear surface joins peripheral edge surface 15, edge E', forming part of said peripheral edge surface 15, is that to which the angle c and the difference d defined hereinabove are referred, lying as previously in front of reference surface S.

Naturally, edge E'' also lies in front of reference surface S.

Figure 8:
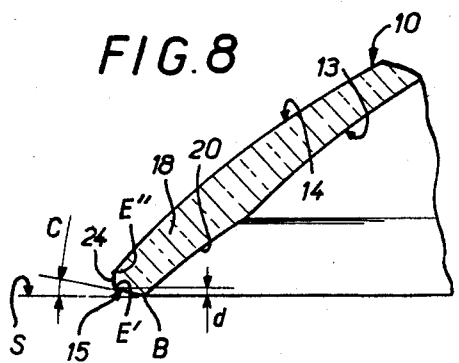
Figure 9:
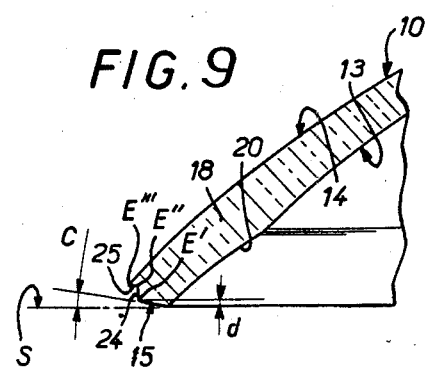

In the embodiment shown in FIG. 9, the area in which peripheral edge surface 15 of contact lens 10 joins its front surface 14 comprises not only a part-cylindrical surface 24, as in the embodiment shown in FIG. 8, but also a plane surface 25 which, for example and as shown in the drawing, is substantially perpendicular to axis A of the lens.

The peripheral edge portion 18 of contact lens 10 thus has three edges, namely an edge E' along which peripheral edge surface 15 intersects part-cylindrical surface 24, edge E'' along which part-cylindrical surface 24 intersects plane surface 25, and a third edge E''' along which plane surface 25 intersects front surface 14 of the lens.

In all cases, peripheral edge surface 15 may be of any profile in transverse cross-section: plane, part-elliptical, part-toroidal or part-spherical, for example, provided that, in accordance with the invention and as previously described, peripheral edge surface 15 extends generally forwardly and obliquely from rear surface 13 of contact lens 10 to its front surface 14.

Also, in all cases contact lens 10 may be thinned out around its perimeter, by shaping its front surface 14.

Figure 10:
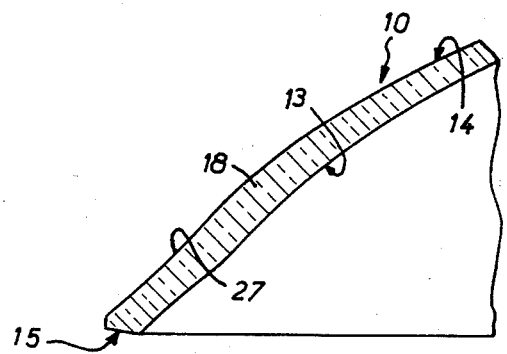
Figure 11:
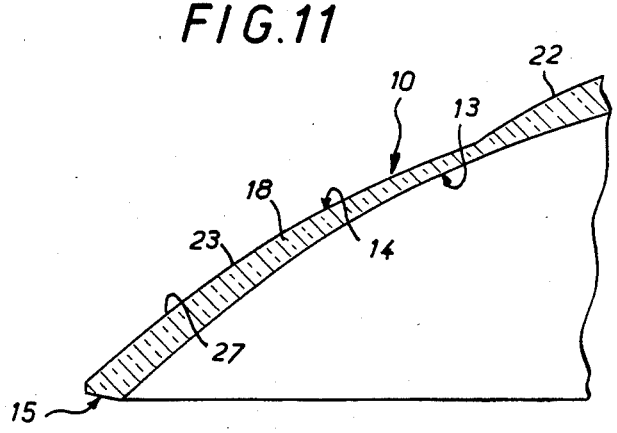

This possibility is shown in FIGS. 10 and 11. FIG. 10 shows a negative contact lens and FIG. 11 a positive contact lens.

Referring to FIG. 10, the surface 27 providing this thinning out is concave. It therefore features a curvature which is the opposite of that of front surface 14 with which it is associated.

In FIG. 11 this surface is part-conical.

it will be understood that various changes in the details, materials, and arrangements of parts, which have been herein described and illustrated in order to explain the nature of the invention, may be made by those skilled in the art within the principle and scope of the invention as expressed in the appended claims.

For example, and as previously mentioned, the area in which the rear surface of the lens joins its peripheral edge surface may be curved.

In other words, when this area is constituted by an edge, this edge is not necessarily planar.

In this case, the reference surface relative to which the position in accordance with the invention of the peripheral edge surface of the contact lens is measured is not necessarily a plane surface, instead constituting a surface which extends in a generally transverse direction relative to the axis of the lens and tangential to the lens in the area in which its rear surface joins its peripheral edge surface, the straight line defining this surface contacting the latter tangentially while being orthogonal to its axis.

In all cases, the contact lens in accordance with the invention, which is not necessarily a flexible contact lens, may advantageously be produced by direct molding, using a molding device as disclosed in the aforementioned French Patent application No. 78 03323, for example.

It is claimed:

1. A contact lens, particularly but not exclusively a flexible contact lens, comprising an inner surface, an outer surface, and a peripheral edge surface extending between said outer and inner surfaces, said peripheral edge surface lying wholly forwardly of a reference surface which extends in a generally transverse direction relative to the axis of said lens through a circle at the juncture of said inner surface and said peripheral edge surface, said peripheral edge surface extending generally obliquely and forwardly relative to said reference surface from said inner surface to said outer surface.

2. A contact lens according to claim 1, wherein said peripheral edge surface is a part-conical surface, the concave side of which is directed forwardly of said reference surface.

3. A contact lens according to claim 2, wherein the angle between said reference surface and a generatrix of said part-conical surface is greater than 0° and less than or equal to 25°.

4. A contact lens according to claim 1, wherein said peripheral edge surface is part-spherical, and its concave side is directed forwardly relative to said reference surface.

5. A contact lens according to claim 1, wherein a peripheral portion along said outer surface is cut back.

6. A contact lens according to claim 5, wherein said cut back peripheral portion along said outer surface is defined in part by a surface which is concave.

7. A contact lens according to claim 5, wherein said cut back peripheral portion along said outer surface is defined in part by a surface which is part-conical.

8. A contact lens according to claim 1, and a connecting zone between said outer surface and said peripheral edge surface being forwardly of said first mentioned connecting zone between said inner surface and said peripheral edge surface relative to said reference surface.

9. A contact lens according to claim 8, wherein the axial distance between said connecting zones is between 0.03 and 0.15 mm.

10. A contact lens according to claim 1, wherein said peripheral edge surface is part-ellipsoidal and its concave surface is directed forwardly relative to said reference surface.

11. A contact lens according to claim 1, wherein said peripheral edge surface is part-toroidal and its concave surface is directed forwardly relative to said reference surface.

12. A contact lens according to claim 1, wherein said peripheral edge surface is part-conical and its concave surface is directed forwardly relative to said reference surface.

13. A contact lens according to claim 1, wherein said peripheral edge surface defines means for alleviating the sucker effect.

14. A contact lens according to claim 1, wherein said inner surface consists of a single spherical surface.

15. A contact lens according to claim 1, wherein said inner surface consists of a central spherical surface bounded by a second spherical surface having a radius greater than that of said central spherical surface.

* * * * *